United States Patent [19]

Deloddere et al.

[11] Patent Number: 5,777,765
[45] Date of Patent: Jul. 7, 1998

[54] OPTICAL DELAY UNIT, OPTICAL LINE EMULATOR INCLUDING SUCH A UNIT AND METHODS REALIZED BY SUCH AN OPTICAL DELAY UNIT AND BY SUCH AN OPTICAL LINE EMULATOR

[75] Inventors: Chris Frans Philippe Deloddere, Knokke-Heist; Stefan Mathieu Alfon Vaes, Houthalen, both of Belgium

[73] Assignee: Alcatel N.V., Rijswijk, Netherlands

[21] Appl. No.: 697,738

[22] Filed: Aug. 29, 1996

[30] Foreign Application Priority Data

Sep. 20, 1995 [EP] European Pat. Off. ............ 95202540.1

[51] Int. Cl.$^6$ .................................................. H04B 10/02
[52] U.S. Cl. ........................... 359/158; 359/140; 359/161
[58] Field of Search ................................ 359/161, 173, 359/174, 175, 176, 177, 179, 158, 188, 140

[56] References Cited

U.S. PATENT DOCUMENTS

| 5,025,142 | 6/1991 | Aoshima et al. | 359/176 |
|---|---|---|---|
| 5,206,753 | 4/1993 | Grimes | 359/117 |

FOREIGN PATENT DOCUMENTS

| 0048640 | 3/1982 | European Pat. Off. . |
| 0390054 | 10/1990 | European Pat. Off. . |
| 0645652 | 3/1995 | European Pat. Off. . |
| 2175103 | 11/1986 | United Kingdom . |
| 9311579 | 6/1993 | WIPO . |

OTHER PUBLICATIONS

Patent Abstracts of Japan, vol. 4, No. 382 (E-564), 12 Dec. 1987 & JP-A-62 146025 (NEC).
Patent Abstracts of Japan, vol. 4, No. 55(P-8), Apr. 1980 & JP-A-53 097662 (Fujitsu) 22 Feb. 1980.

Primary Examiner—Leslie Pascal
Attorney, Agent, or Firm—Milton Oliver; Ware, Fressola, Van Der Sluys & Adolphson

[57] ABSTRACT

The optical delay unit (ODL) introduces a programmable delay of an optical signal on an optical signal path. The delay of the optical signal is realised by converting the incoming optical signal (IN) into an electrical signal, then delaying the electrical signal, using electronic devices in an electrical delay unit (ELDL), and finally converting the electrical signal into an optical signal. The electrical delay is controlled by an operator sending control data (A) via a control interface (CI) to the electrical delay unit (ELDL). A first use relates to the testing of the normal operation and/or performance of an optical network for different optical line lengths. A second use relates to the inclusion of the delay unit in an optical line emulator (OLE), wherein this optical delay unit (ODL) is coupled to an optical attenuator (ATT) which is also controlled by an operator sending control data (B) via the control interface (CI) and a power control unit (PCU). This optical line emulator (OLE) simulates an optical line by simulating the delay and the attenuation of an optical signal on the optical signal path on which the optical signal is transmitted.

10 Claims, 1 Drawing Sheet

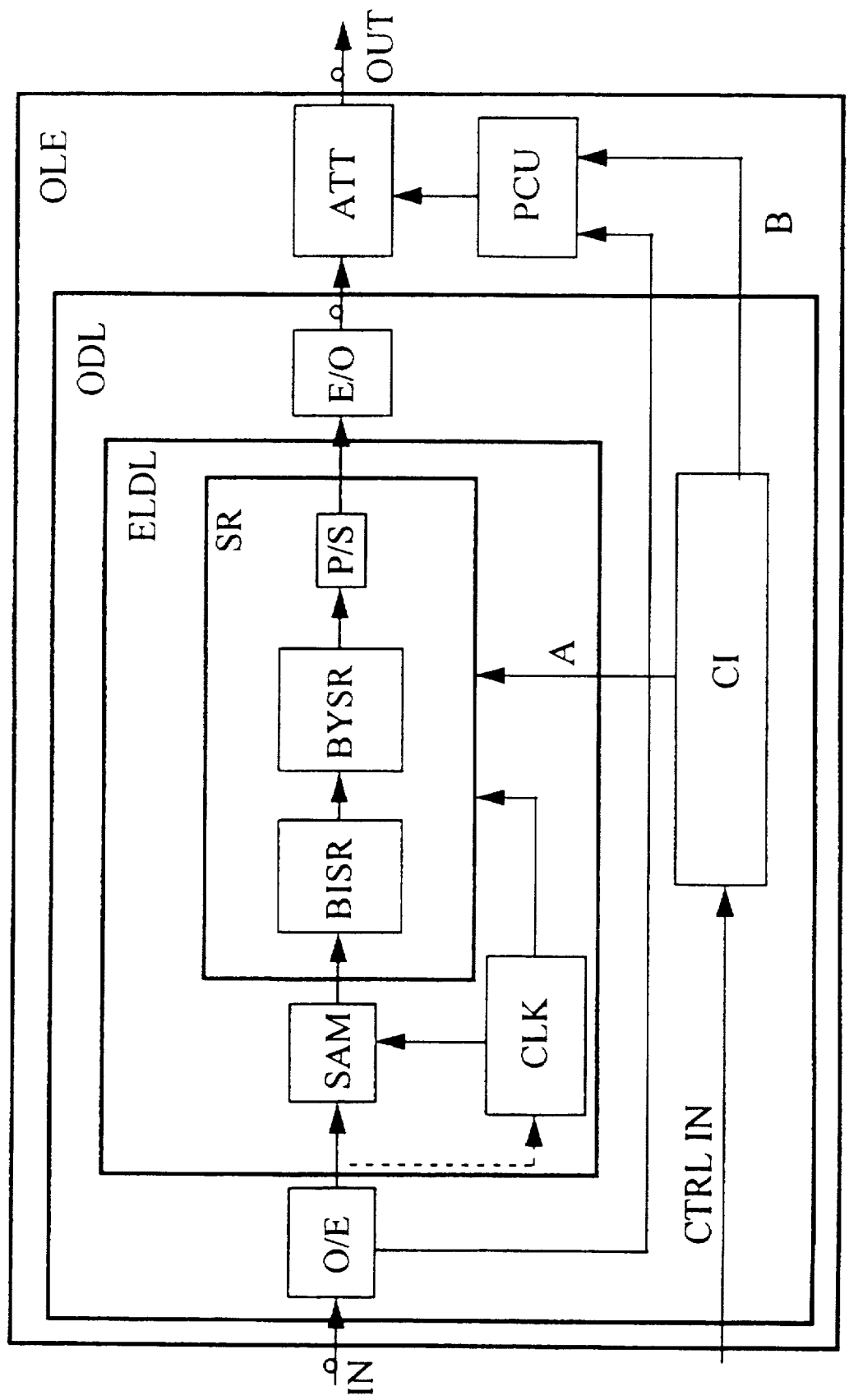

OPTICAL DELAY UNIT, OPTICAL LINE EMULATOR INCLUDING SUCH A UNIT AND METHODS REALIZED BY SUCH AN OPTICAL DELAY UNIT AND BY SUCH AN OPTICAL LINE EMULATOR

TECHNICAL FIELD

The present invention relates to a device to delay an optical signal with a predetermined optical delay value. It is also directed to an optical line emulator to stimulate the delay and attenuation of an incoming optical signal (IN) caused by the line length of an optical signal path on which said incoming optical signal is transmitted.

It is still further directed to a method for delaying an optical signal and to a method for emulating an optical line.

BACKGROUND OF THE INVENTION

Such an optical delay unit is already known in the art, for instance from the published European patent application EP-A1-0645652 OSBORNE wherein an optical signal is delayed by means of a wavelength conversion device and a wavelength selective delay line. The wavelength of an optical signal emitted by the wavelength conversion device is variable and the delay time of the optical signal is controlled in steps as a function of the respective wavelength.

The delay time of such known delay units is limited in range. Indeed, these units are used in e.g. an arrangement for changing the sequence of serially transmitted blocks of data or used to synchronise a plurality of optical signals at the inputs of an exchange apparatus, and as a result thereof, there is no need for a wide range of delays. Moreover, the introduced delay on the optical signal of such delay units can only be controlled in a discrete way since the used wavelengths can only have discrete values. Therefore, such optical delay units are not suited to simulate the total transport delay of an optical signal caused by the line length of the optical signal path on which this optical signal is transmitted.

SUMMARY OF THE INVENTION

An object of the present invention is to provide a device such as the known one, but which introduces a delay on the optical signal which can be controlled in a continuous way and which has an extended range.

According to the invention this object is realised by means of a device to delay an incoming optical signal with a predetermined optical delay value, characterized in that said device includes an optical/electrical converter to convert said incoming optical signal into an electrical signal; an electrical delay unit coupled to said optical/electrical converter to delay said electrical signal, thereby generating a delayed electrical signal; at least one electrical/optical converter coupled to said electrical delay unit to convert said delayed electrical signal into an outgoing delayed optical signal; and a control interface coupled to a control input of said electrical delay unit and via which control data is provided to control the delay of said electrical signal, said control data being determined by said optical delay value. Such a device realizes a method to delay an incoming optical signal characterized in that said method comprises the steps of: converting said incoming optical signal into an electrical signal; delaying said electrical signal to obtain a delayed electrical signal; and converting said delayed electrical signal into an outgoing delayed optical signal. Indeed, since the delay of the optical signal is obtained by a delay on an electrical signal using electronic devices, the introduced delay on the optical signal is continuous and can reach a much wider range.

As a result, the normal operation and/or performance of an optical network can be tested more extensively and much faster for different line lengths by introducing a controllable optical delay as a simulation for the optical line length.

A possible implementation/realisation of the device to delay an optical signal is characterized in that said electrical delay unit includes a sampling device coupled to said optical/electrical converter to sample said electrical signal at regular intervals of time, thereby generating serial electrical data; a shift register with a programmable tap coupled to said sampling device to delay said serial electrical data under control of said control data, thereby generating said delayed electrical signal; and a clock generator coupled to said sampling device and to said shift register to provide both devices with a clock signal. A method to delay an optical signal is characterized in that said clock generator is also coupled to said optical/electrical converter to extract said clock signal from said electrical signal.

Yet a further characteristic feature of the present device/method is where the overall delay is a combination of the delay in the bit shift register and the delay in the byte shift register, both controllable via the control interface.

An application of the device/method is as an optical line emulator which simulates an optical line by simulating the delay and the attenuation of an optical signal caused by the line length of an optical signal path on which the optical signal is transmitted.

The above mentioned and other objects and features of the invention will become more apparent and the invention itself will be best understood by referring to the following description of an embodiment taken in conjunction with the accompanying drawing which represents a general functional block scheme of an embodiment of an optical line length emulator including an optical delay unit according to the present invention.

BRIEF DESCRIPTION OF THE DRAWINGS

There is 1 FIGURE.

BEST MODE FOR CARRYING OUT THE INVENTION

The working of the optical line emulator OLE shown in the FIGURE will be explained by means of a functional description of the different blocks as shown therein. Based on this description, the practical implementation of the blocks will be obvious for a person skilled in the art.

The optical line emulator OLE includes an optical delay unit ODL, an optical attenuator ATT coupled to an electrical/optical converter E/O included in the optical delay unit ODL and an optical power control unit PCU coupled to the attenuator ATT and also coupled to an optical/electrical converter O/E and to a control interface CI both included in the optical delay unit ODL. The optical attenuator ATT is a device which is commercially available on the market and therefore the working of the optical attenuator is not described in details. A functional description of the power control unit PCU is given in the following paragraphs. Based on this description the practical implementation of the power control unit PCU is obvious for a person skilled in the art.

The optical delay unit ODL includes the following basic parts:

the above mentioned optical/electrical converter O/E realised with the commercial available device Optical Receiver RX from Hewlett Packard;

an electrical delay unit ELDL coupled to the optical/electrical converter O/E;

the above mentioned electrical/optical converter E/O coupled to the electrical delay unit ELDL and realised with the commercial available device Optical Transmitter MF622DF-T12- 06 from Mitsubishi; and the above mentioned control interface CI coupled to the electrical delay unit ELDL and which is consisting of a RS232 driver/receiver MAX232 for connection via a straight cable to a standard RS232 PC workstation and of a 9600 baud receiver and data decoder both realised in a Xilinx XC3090-125 component.

The electrical delay unit ELDL includes three basic parts:

a sampling device SAM coupled to the optical/electrical converter O/E;

a clock generator CLK coupled to the sampling device SAM; and a shift register with programmable tap SR coupled to the sampling device SAM and the electrical/optical converter E/O and controlled by the control interface CI.

It has to be remarked that the clock generator CLK could also be coupled to the optical/electrical converter O/E to extract the clock signal from the electrical signal coming from the optical/electrical converter O/E. This possible interconnection is shown in the drawing by means of a dashed line and is also realised in this described embodiment by integrating the sampling device SAM and the clock generator CLK in one commercial available component from Cypress i.e. CY7B951.

The shift register with programmable tap SR includes the following basic parts:

a bit shift register BISR coupled to the sampling device SAM, the clock generator CLK and the control interface CI and realised by means of a commercial available 1 bit to 4 bits serial to parallel converter and a barrel shift register which is also included in the Xilinx XC3090-125 component;

a byte shift register BYSR coupled to the bit shift register BISR and the control interface CI and realised with a commercial available device FIFO 4kx9 from the supplier Integrated Device Technology i.e. IDT72241;

a parallel to serial converter P/S coupled between the byte shift register BYSR and the electrical/optical converter E/O and realised with a 8 to 4 bit converter also included in the the Xilinx XC3090-125 component and a commercially available 4 bits to 1 bit parallel to serial converter;

To increase the delay resolution of the optical delay unit ODL, an analog programmable delay line APDL (not shown) is inserted between the parallel to serial converter P/S and the electrical/optical converter E/O.

It has to be remarked that, although the use of such an analog programmable delay line APDL is mentioned in this preferred embodiment, it will be obvious to a person skilled in the art that the present optical delay unit ODL is not restricted to devices wherein an analog programmable delay line APDL is applied.

The signal flow of the incoming optical signal IN through the optical line emulator OLE is described in the following paragraph.

The incoming optical signal IN is converted by the optical delay unit ODL into an outgoing delayed optical signal under the control of control data A. This control data A is generated by the control interface CI in response to control data CTRL IN originating from an operator (not shown).

The outgoing delayed optical signal is attenuated by the attenuator ATT under the control via the power control unit PCU from control data B also generated by the control interface CI as a result of the receipt of control data CTRL-IN.

Using the optical line emulator OLE, an optical line is simulated by simulating the delay and the attenuation of the optical signal caused by the line length of the optical signalpath on which the optical signal is transmitted. The control of this simulation is done by an operator sending the earlier mentioned control data CTRL IN to the control interface CI.

The optical delay unit ODL is delaying the incoming optical signal IN as follows. The incoming optical signal IN is converted by the optical/electrical converter O/E into an electrical signal. The electrical delay unit ELDL is delaying the electrical signal thereby generating a delayed electrical signal. The control data A which is provided by the operator via the control interface CI to the electrical delay unit ELDL controls the delay of the electrical signal. The electrical/optical converter E/O is converting the delayed electrical signal into the outgoing delayed optical signal.

In the electrical delay unit ELDL the electrical signal is first sampled by the sampler SAM at regular intervals of time determined by the clock cycle of the clock signal of the clock generator CLK thereby generating serial electrical data. The serial electrical data is then delayed in the shift register with programmable tap SR providing the delayed electrical signal.

The delay from the serial electrical data in the shift register SR is realised as follows. The bit shift register BISR is delaying the electrical data in steps of a multiple of the clock cycle of the clock signal and the byte shift register is further delaying the electrical data in steps of a multiple of the octuple of the clock cycle of the clock signal thereby generating delayed parallel electrical data. The delayed parallel electrical data is converted into delayed serial electrical data in the parallel to serial converter P/S. This delayed serial electrical data constitutes the delayed electrical signal.

As mentioned earlier, the delayed electrical signal is further delayed by the programmable analog delay line APDL.

The control data A, which is a 4 bytes signal controls the bit shift register BISR, the byte shift register BYSR and the analog programmable delay line APDL to realise the wanted delay of the electrical data. Small delays, up to one clock cycle, are controlled by the four less significant control bits of A using the programmable analog delay line APDL. Delays, up to seven clock cycles are controlled by the bits number 4 to 6 of A using the bit shiftregister BISR. And finally the delays, up to a multiple of the octuple of the clock cycle, are controlled by the remaining control bits of A using the byte shift register BYSR.

To obtain the overall delay of the optical signal a summation is performed of the three delays described above and of the minimum delay needed for the optical signal to pass through the optical delay unit ODL.

The simulated optical line length is calculated from the total delay of the optical signal by multiplying the latter delay with the light speed and dividing the result by the refractive index of the optical signal path.

It should be noted that the control data CTRL IN could be generated by an automated test program running on a computer and thus without manual intervention. In this way, no man-power would be consumed.

It should furthermore be noted that the optical delay unit ODL could be used in an asynchronous transfer mode or ATM passive optical network or APON (not shown), to test the main characteristics of the APON for different optical linelengths. In this possible implementation the attenuator ATT and the power control unit PCU would not be used and the optical delay unit ODL would be coupled between the APON optical line termination and an APON optical network termination (also not shown).

While the principles of the invention have been described above in connection with specific apparatus, it is to be clearly understood that this description is made only by way of example and not as a limitation on the scope of the invention.

We claim:

1. A device (ODL) to delay an incoming optical signal (IN) with a predetermined optical delay value, characterized in that said device includes:

an optical/electrical converter (O/E) to convert said incoming optical signal (IN) into an electrical signal;

an electrical delay unit (ELDL) coupled to said optical/electrical converter (O/E) to delay said electrical signal, thereby generating a delayed electrical signal, said electrical delay unit having a sampling device (SAM) coupled to said optical/electrical converter (O/E) to sample said electrical signal at regular intervals of time, thereby generating serial electrical data;

a shift register (SR) with a programmable tap coupled to said sampling device (SAM) to delay said serial electrical data, thereby generating said delayed electrical signal; and a clock generator coupled to said sampling device and to said shift register (SR) to provide a clock signal to both said sampling device and said shift register;

at least one electrical/optical converter (E/O) coupled to said electrical delay unit (ELDL) to convert said delayed electrical signal into an outgoing delayed optical signal; and a control interface (CI) coupled to a control input of said electrical delay unit and via which control data (A) is provided to control the delay of said electrical signal, said control data (A) being determined by said optical delay value and being applied to an input of said shift register (SR).

2. A device (ODL) to delay an incoming optical signal (IN) according to claim 1, characterized in that said clock generator (CLK) is also coupled to said optical/electrical converter (O/E) to extract said clock signal from said electrical signal.

3. A device (ODL) to delay an incoming optical signal (IN) according to claim 2, characterized in that said shift register (SR) includes:

a bit shift register (BISR) with programmable tap coupled to said sampling device (SAM) and to said clock generator (CLK) to delay said serial electrical data under the control of said control data (A), thereby generating electrical data;

a byte shift register (BYSR) with a programmable tap coupled to said bit shift register (BISR) to delay said electrical data under the control of said control data (A), thereby generating delayed parallel electrical data; and a parallel/serial converter (P/S) coupled to said byte shift register (BYSR) to convert said delayed parallel electrical data to delayed serial electrical data which constitutes said delayed electrical signal.

4. A device (ODL) to delay an incoming optical signal (IN) according to claim 1, characterized in that said shift register (SR) includes:

a bit shift register (BISR) with programmable tap coupled to said sampling device (SAM) and to said clock generator (CLK) to delay said serial electrical data under the control of said control data (A), thereby generating electrical data;

a byte shift register (BYSR) with programmable tap coupled to said bit shift register (BISR) to delay said electrical data under the control of said control data (A), thereby generating delayed parallel electrical data; and a parallel/serial converter (P/S) coupled to said byte shift register (BYSR) to convert said delayed parallel electrical data to delayed serial electrical data which constitutes said delayed electrical signal.

5. An optical line emulator (OLE) to simulate the delay and attenuation of an incoming signal (IN) caused by the line length of an optical signal path on which said incoming optical signal is transmitted, characterized in that said optical line emulator (OLE) includes a device (ODL) to delay an incoming optical signal (IN) with a predetermined optical delay value, said device including an optical attenuator (ATT) coupled to an electrical/optical converter ((E/O) included in said device (ODL) to attenuate an outgoing delayed optical signal generated by said device (ODL); and an optical power control unit (PCU) coupled to respective outputs of an optical/electrical converter (O/E) and of a control interface (CI) included in said device (ODL) and to a control input of said optical attenuator (ATT) to control the attenuation of said outgoing delayed optical signal.

6. A method of delaying an incoming optical signal (IN) comprising the steps of:

converting said incoming signal into an electrical signal;

delaying said electrical signal by generating a clock signal, sampling said electrical signal at regular intervals of time determined by said clock signal, thereby generating serial electrical data, and shifting said serial electrical data with a programmable tap, thereby obtaining a delayed electrical signal; and converting said delayed electrical signal into an outgoing delayed optical signal.

7. A method according to claim 6 characterized in that said step to shift said serial electrical data with programmable tap comprises the steps of:

shifting said serial electrical data, bit by bit, with programmable tap, thereby generating electrical data;

shifting said electrical data, byte by byte, with programmable tap, thereby generating delayed parallel electrical data; and converting said delayed parallel electrical data into delayed serial electrical data which constitutes said delayed electrical signal.

8. A method according to claim 6, characterized in that said step to delay said electrical signal further comprises the step of extracting said clock signal from said electrical signal.

9. A method according to claim 8 characterized in that said step to shift said serial electrical data with programmable tap comprises the steps of:

shifting said serial electrical data, bit by bit, with programmable tap, thereby generating electrical data;

shifting said electrical data, byte by byte, with programmable tap, thereby generating delayed parallel electrical data; and converting said delayed parallel electrical data into delayed serial electrical data which constitutes said delayed electrical signal.

10. A method to simulate the delay and attenuation of an incoming optical signal (IN) caused by the line length of an optical signal path on which said optical incoming signal (IN) is transmitted characterized in that said method comprises converting said incoming optical signal (IN) into an electrical signal; delaying said electrical signal to obtain a delayed electrical signal; converting said delayed electrical signal into an outgoing delayed optical signal and attenuating the outgoing delayed optical signal.

* * * * *